(12) United States Patent
Cai et al.

(10) Patent No.: US 8,699,451 B2
(45) Date of Patent: Apr. 15, 2014

(54) UPDATE METHOD OF WIRELESS RELAY STATION LINK RELATION

(75) Inventors: Sean Cai, San Diego, CA (US); Ling Xu, Shenzhen (CN)

(73) Assignee: ZTE Corporation (CN)

( * ) Notice: Subject to any disclaimer, the term of this patent is extended or adjusted under 35 U.S.C. 154(b) by 600 days.

(21) Appl. No.: 12/595,622

(22) PCT Filed: Dec. 12, 2007

(86) PCT No.: PCT/CN2007/003565
§ 371 (c)(1),
(2), (4) Date: Oct. 13, 2009

(87) PCT Pub. No.: WO2008/124986
PCT Pub. Date: Oct. 23, 2008

(65) Prior Publication Data
US 2010/0054155 A1   Mar. 4, 2010

(30) Foreign Application Priority Data

Apr. 13, 2007   (CN) .......................... 2007 1 0101416

(51) Int. Cl.
*H04W 4/00*   (2009.01)
(52) U.S. Cl.
USPC .......................................... 370/331; 455/436
(58) Field of Classification Search
None
See application file for complete search history.

(56) References Cited

U.S. PATENT DOCUMENTS

| | | | | |
|---|---|---|---|---|
| 7,986,915 B1 * | 7/2011 | Wang et al. | ........................ | 455/7 |
| 2008/0084856 A1 * | 4/2008 | Ramachandran | ............ | 370/342 |
| 2008/0107081 A1 * | 5/2008 | Isobe et al. | ..................... | 370/331 |
| 2008/0123584 A1 * | 5/2008 | Behrendt et al. | .............. | 370/315 |
| 2008/0181176 A1 * | 7/2008 | Lee et al. | ....................... | 370/331 |

FOREIGN PATENT DOCUMENTS

| | | |
|---|---|---|
| CN | 1842207 A | 10/2006 |
| EP | 1 773 091 A2 | 4/2007 |
| JP | 2000151495 A | 5/2000 |
| JP | 2006157666 A | 6/2006 |
| JP | 2006287468 A | 10/2006 |
| JP | 2007-5963 A | 1/2007 |

OTHER PUBLICATIONS

V. Sreng, H. Yaniomeroglu and D. D. Falconer; Relayer Selection Strategies in Cellular Networks with Peer-to-Peer Relaying;; Broadband Communications and Wireless Systems (BCWS) Centre, Dept. of Systems and Computer Engineering, Carleton University, Ottawa, Canada, {vsreng,halim,ddf}@sce.carelton.ca-5 Pages.

* cited by examiner

*Primary Examiner* — Marcus R Smith
(74) *Attorney, Agent, or Firm* — Brooks Kushman, P.C.

(57) ABSTRACT

A method for updating a connection relationship of a wireless relay station, comprises the following steps of: (a) a wireless relay station RS1 already connecting to a wireless communication network group comprising a base station and wireless relay stations subjected to the base station, and if determining that the connection relationship of RS1 needs to be changed, selecting a target node; (b) instructing RS1 to update the connection to the target node, and after receiving the instructions, RS1 starting a connection update, establishing a wireless link to a new node and releasing no longer used resource in an existing data tunnel. The present invention can fulfill the update of the connection relationship of a wireless relay station, and can take steps to further guarantee the service suspension time of the terminals and RSs subjected to the wireless relay station is the shortest.

20 Claims, 11 Drawing Sheets

UPDATE METHOD OF WIRELESS RELAY STATION LINK RELATION

TECHNICAL FIELD

The present invention relates to a wireless communication network comprising a base station and wireless relay stations, and more specifically, to a method for updating the connection relationship of a wireless relay station in the wireless communication network.

BACKGROUND OF THE INVENTION

Nowadays, there are a variety of wireless communication systems, of which the commonalities are: the complication of stations' construction, the cable support needed by the base stations, and the relatively fixed coverage of the base stations. Due to the complexity of the wireless communication environment, such as buildings' obstruction in the dissemination path or obstacles between the receiving antenna and transmitting antenna of a base station and a user, a user may be in the blind area of a base station service. As such, although the user is in the area covered by the base station, he can not communicate with the base station normally, thus the user's communication quality is severely deteriorated; or even the user can not access to the system. For a user at the edge of a cell, the signal decays severely since the signal has traveled a relatively long path, thus the communication quality and service quality between the user and the base station is impacted, for example, in order to guarantee a user at the edge of a cell can receive the signal from the base station normally, a low order encoding and modulation method has to be applied, therefore the user's data rate is decreased; and if a high order encoding and modulation method is applied to guarantee the user's data rate, the communication power of both the base station and the use need to be increased, which will interfere other users in the cell and users in the adjacent cells. In addition, with the development of the application, these wireless access systems can not well meet the wireless access requirement of random burst and covering some areas unreachable by cable.

Therefore, in order to expand the coverage of the base station service area and improve the service quality of users at the edge of a cell, multiple types of relay systems have been developed so far, that is, the communication between a base station and a user is implemented through a relay station.

The relay system that emerged earlier is an analog relay system. After a relay station receives a signal, the signal received is analogically amplified without digital processing and then sent to a user, a base station, or the next relay station. This relay method is simple, but its disadvantage is obvious: besides the effective signal, the in-band interference signal received by the relay station is also amplified and sent in the communication path. Therefore, the reliability of the useful signal is decreased after passing the relay station.

With the development of technology, the digital relay system is becoming mature. The system can demodulate and decode the received signal to acquire the source signal, and after storing and processing the signal, the system encodes and modulates the signal again, and sends the signal to a user, a base station, or the next relay station. This relay method prevents the communication of the noise in the analog signal, and improves the reliability of the communication.

Generally, a wireless communication system provides a point-to-multipoint network topology structure for high-speed wireless data communication. In order to solve the problem in the communication quality of the users at the edge of a cell or in the blind area of a base station service, the concept of wireless relay station is introduced into the wireless network. However, the fixity, nomadic property and mobility of the wireless relay station is a new challenge for the management of the whole wireless network, such as dynamic construction and adjustment of the wireless network.

But the introduction of this kind of wireless relay stations greatly complicates the management of the wireless network. The construction, maintenance and optimization of the conventional relay stations are manually implemented, and the workload is very heavy for a practical application. Whereas a digital relay station can perform base band processing by itself, has a certain capability of control and resource scheduling, and is able to select a base station or wireless relay station to access to. These properties provide a basis for the self-configuration and self-optimization of the wireless relay station.

In a wired IP network, a routing table can be used to help a routing gateway to select the optimal path for route optimization, and the routing gateway needs to dynamically maintain the routing table. But this method is not suitable to apply in a wireless communication network, mainly for the following reasons:

Each node in a wireless communication network may cause the update of the wireless links due to the changing of the wireless environment status. This is different from the fixed connection in a wired network.

The reliability of a wireless link in a wireless communication network is different from that of a wired network.

Each wireless link in a wireless communication network needs to occupy wireless resource, and the wireless link occupies the wireless resource once it is established.

Based on the above problems, a new solution is needed to solve how a wireless relay station performs self-configuration and self-optimization in a wireless network.

In addition, for this type of wireless communication network, there is no reasonable solution provided in the prior art to solve problems such as how a wireless relay station to join a wireless communication network group, how to update a connection relationship, and how to terminate a connection relationship.

SUMMARY OF THE INVENTION

In order to solve the above technical problem, the present invention provides a method for updating the connection relationship of a wireless relay station.

In order to solve the above technical problem, the present invention provides a method for updating a connection relationship of a wireless relay station, comprising the following steps of:

(a) a wireless relay station RS1 already connecting to a wireless communication network group comprising a base station and wireless relay stations subjected to the base station, and if determining that the connection relationship of RS1 needs to be changed, selecting a target node;

(b) instructing RS1 to update the connection to the target node, and after receiving the instructions, RS1 starting a connection update, establishing a wireless link to a new node and releasing no longer used resource in an existing data tunnel.

Moreover, the above method may further comprise:

a management node in the wireless communication network group storing a topology relationship information of the group, and after step (b) the method further comprising a step:

(c) the management nodes in the communication groups of

RS1 before and after the connection relationship update updating stored wireless network topology information of the communication groups; or a management node in the wireless communication network group storing a topology relationship information of the group, and RS1 accessing to communication sub-networks before and after the update, and agent nodes in said communication sub-networks storing wireless network topology information of the communication sub-networks, and after step (b) the method further comprising a step: the management nodes in the communication groups of RS1 before and after the connection relationship update updating stored wireless network topology information of the communication groups, and meanwhile, the agent nodes in the communication sub-networks of RS1 before and after the update updating the stored wireless network topology information of the communication sub-networks.

Moreover, the above method may further have the following feature:

in step (a), whether the connection relationship of RS1 should be changed is determined by the base station in the communication group of RS1 based on a stored information and a preset strategy, and the target node is selected by the base station; and in step (b), the base station sends to RS1 said instructions to update the connection to the target node; or in step (a), whether the connection relationship of RS1 should be changed is determined by a wireless relay station as an agent node in a communication sub-network to which RS1 belongs based on a stored information and a preset strategy, and the target node is selected by the wireless relay station as the agent node; and in step (b), said wireless relay station as the agent node sends to RS1 said instructions to update the connection to the target node.

Moreover, the above method may further have the following feature:

in step (a), whether the connection relationship of RS1 should be changed is determined by the wireless relay station as the agent node in the communication sub-network of RS1 or the base station in the communication group of RS1 based on a stored information and a preset strategy, and there is one or any combination of the following triggering modes: need for coverage, need for load balancing, need for increasing throughput, need for improving service quality and need for network management by an operator.

Moreover, the above method may further comprise:

in step (a), RS1 determining whether the connection relationship of RS1 should be changed based on a stored information and a preset strategy, and after selecting a target node, RS1 unsolicitedly sending a handover request to the base station in the wireless communication network group or a wireless relay station as an agent node in a communication sub-network to which RS1 belongs; and after said base station or wireless relay station receives the handover request, if determining that the handover can be performed, said base station or wireless relay station determining a target node selected by said base station or wireless relay station, otherwise rejecting the handover request.

Moreover, the above method may further comprise:

after said base station or wireless relay station as the agent node receives the handover request from RS1, taking the target node selected by RS1 as the target node selected by said base station or wireless relay station as the agent node; or based on an information provided by RS1, a stored information and a preset strategy, choosing part of the target nodes selected by RS1 as the target nodes selected by said base station or wireless relay station as the agent node; or selecting a new target node for RS1 based on an information provided by RS1, a stored information and a preset strategy.

Moreover, the above method may further have the following feature:

triggering modes for said wireless relay station to unsolicitedly request an update of the connection relationship in step (a) comprises one or more of the following: discovering a better wireless signal, need for obtaining better wireless resource, need for applying for better service quality and need for network management.

Moreover, the above method may further have the following feature:

in step (a), an information, based on which whether the connection relationship of RS1 should be updated is determined and the target node is selected, comprises one or more pieces of the following information: a network topology relationship information of the group, a wireless links status information of the group, network topology relationship information of adjacent wireless communication network groups, wireless links status information of adjacent wireless communication network groups and information of adjacent cells detected by RS1.

Moreover, the above method may further comprise:

in step (a), after said base station or wireless relay station as the agent node selects the target node, firstly sending a handover request to the target node, and after obtaining a response that the target node allows the handover, instructing RS1 to update the connection in step (b).

Moreover, the above method may further comprise:

in step (b), if RS1 has data to transmit, while reserving an original connection or original connections, the wireless relay station as the agent node in the communication sub-network of RS1 or the base station in the communication group of RS1 establishing a data tunnel to the target node for RS1 and sending downlink data of RS1 in this data tunnel, and then instructing RS1 to update the connection to the target node.

Moreover, the above method may further have the following feature:

if said target node belongs to another wireless communication network group, said data tunnel to the target node is established according to one of the following modes:

the first mode is: if the target node is another base station, a data node at the network side→the base station of RS1 before a handover→the target base station; if the target node is a wireless relay station connecting to another base station, a data node at the network side→the base station of RS1 before a handover→the base station of the target wireless relay station→the target wireless relay station;

the second mode is: if the target node is another base station, a data node at the network side→the target base station; if the target node is a wireless relay station connecting to another base station, a data node at the network side→the base station of the target wireless relay station→the target wireless relay station;

the third mode is: a data node at the network side→the base station to which RS1 accesses before a handover→the wireless relay station to which RS1 accesses before a handover→the target wireless relay station or target base station.

Moreover, the above method may further have the following feature:

if said target node belongs to the same wireless communication network group, said data tunnel to the target node is established according to one of the following modes:

the first mode is: a data node at the network side→the base station of RS1→the target wireless relay station.

the second mode is: a data node at the network side→the wireless relay station to which RS1 accesses before a handover→the target wireless relay station.

Moreover, the above method may further comprise:

in step (b), before instructing RS1 to update the connection to the target node, if RS1 has data to transmit, while reserving an original connection or original connections, the base station of RS1 before a handover, or a wireless relay station as an agent node in a communication sub-network to which RS1 belongs, or the network side sending attributes of RS1 and wireless relay stations and terminals connecting to RS1 to the base station of the target node or a wireless relay station as an agent node in a communication sub-network to which the target node belongs, to be used during an access.

Moreover, the above method may further comprise:

wireless relay stations or terminals synchronizing with possible adjacent base stations or adjacent wireless relay stations in advance and storing this synchronization information; in step (b), after wireless relay stations and terminals connecting to RS1 receive instructions to update connections, finding the synchronization information of the target node in the instructions from the stored synchronization information of adjacent base stations and adjacent wireless relay stations, and synchronizing with the target node and establishing wireless network connections.

Moreover, the above method may further have the following feature: said management node is the base station.

With the method of the present invention, in a wireless communication system, the connection relationship update of wireless relay stations can be implemented, moreover, through the construction and update of the topology relationship, the topology relationship and resource configuration of the wireless relay stations and the base station can be intelligently adjusted, thus the service quality and resource utilization rate of the wireless communication network can be effectively improved. During an update process, by establishing a data tunnel to the target node, sending the attributes information of the wireless relay station to be updated and the terminals and wireless relay stations connecting thereto, pre-storing the synchronization information of adjacent nodes, and so on, the time period of service suspension during the connection relationship update can be shortened to the fullest extent, and the service quality can be improved.

PREFERRED EMBODIMENTS OF THE PRESENT INVENTION

The present invention will be described in detail with combination of the accompanying drawings and embodiments.

Figure 1:
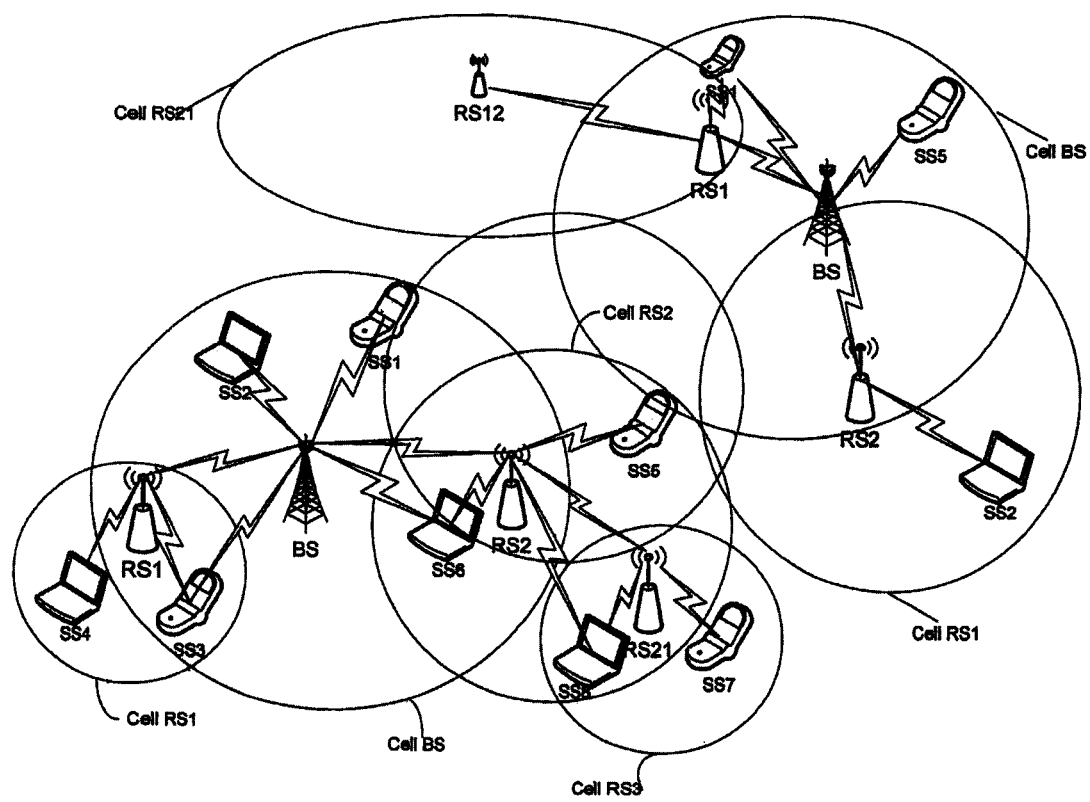
FIG. 1 is the networking diagram of a wireless relay communication system in accordance with the present invention.

FIG. 1 shows the wireless communication system in which an intelligent construction of wireless relay of the present invention is applied, and the system comprises the following parts:

1) At least one base station, sending synchronization signals and control information for the access and control of terminals and relay stations; the base station may directly communicate with the terminals; the base station may also communicate with the terminals through the relay stations.

2) At least one first-hop relay station (RS), directly accessing to a base station, and the base station and the wireless relay station sending synchronization signals and control information for the access and control of terminals and other relay stations.

3) At least one terminal, communicating with a base station through relay stations;

4) A multi-hop relay station, which might be comprised in the system;

5) A terminal directly communicating with a base station, which might be comprised in the system.

As shown in FIG. 1, each base station may have one or more wireless relay stations, and each wireless relay station may further have wireless relay stations according to its demand, which is the mode of BS→RS→RS, for example, RS21 in FIG. 1 is a second hop wireless relay station. Some RS, such as RS1, is to expand the network coverage, and some RS, such as RS2, is to increase the throughput. Terminals can receive signals from multiple base stations and wireless relay stations simultaneously.

Thereby, the present invention refers to the group composed of a BS and the RSs subjected to the BS (the RSs which directly or indirectly access to the BS) as a wireless communication network group. One base station has only one wireless communication network group and different base stations belong to different wireless communication network groups.

Embodiments of the adaptive management method for a wireless communication network in accordance with the present invention will be described below.

The First Scheme

Figure 2:
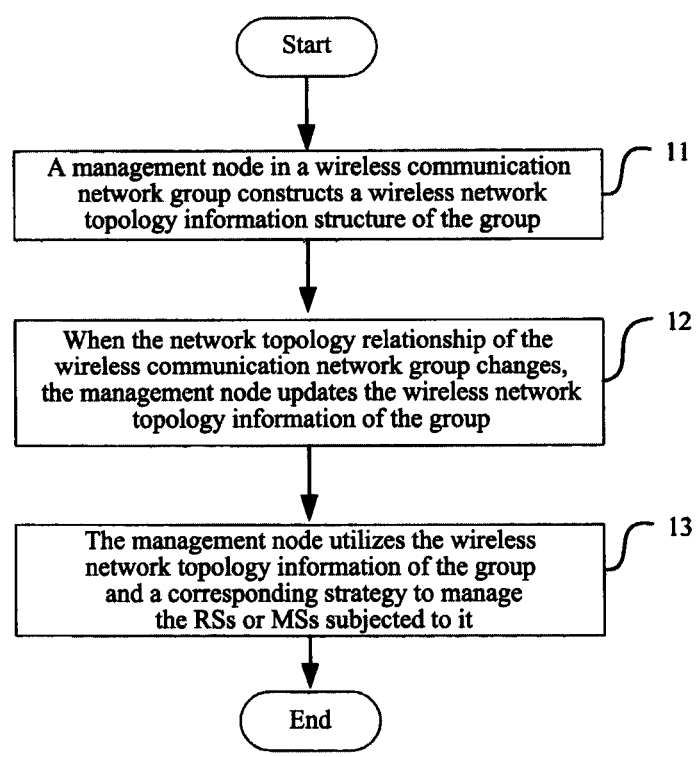
FIG. 2~FIG. 5 are four illustrations of the adaptive management method for a wireless communication network in accordance with the present invention.

As shown in FIG. 2, this scheme comprises the following steps:

Step 11, a management node in a wireless communication network group constructs a wireless network topology information structure of the group;

The wireless network topology information structure in this scheme comprises information of the nodes at two ends of wireless links in the wireless communication network group, and the nodes at the ends can be represented by the base station ID (BSID) and relay station ID (RSID).

Above-mentioned information can be illustrated with a basic relationship matrix in which the connection relationship between any two nodes in the wireless communication network group is described, including the information whether there is a connection or not, and the information of the number of hops if there is a connection.

Taking FIG. 1 for example, the relationship matrix of the wireless communication network group to which the base station at the left side belongs is as follows:

|      | BS | RS1 | RS2 | RS21 |
|------|----|-----|-----|------|
| BS   | 0  | 1   | 1   | 2    |
| RS1  | 1  | 0   | 0   | 0    |
| RS2  | 1  | 0   | 0   | 1    |
| RS21 | 2  | 0   | 1   | 0    |

Similarly, the relationship matrix of the wireless communication network group to which the base station at the right side of FIG. 1 belongs is as follows:

|      | BS | RS1 | RS11 | RS2 |
|------|----|-----|------|-----|
| BS   | 0  | 1   | 2    | 1   |
| RS1  | 1  | 0   | 1    | 0   |
| RS11 | 2  | 1   | 0    | 0   |
| RS2  | 1  | 0   | 0    | 0   |

Here, the first row and the first column are the numberings of all the nodes in the wireless communication network group. And "0" indicates that there is no wireless link between these two nodes. While "1" indicates that there is a direct wireless link between these two nodes, and taking the "1" in the second row and third column for example, the "1" indicates that there is a direct wireless connection between RS1 and BS. "2" indicates that these two nodes are connected by two wireless links. Taking the "2" in the second row and the fifth column for example, the "2" indicates that RS21 and BS are connected by two wireless links, that is, RS21 connects with BS through a wireless relay station.

Therefore, a "1" in the relationship matrix corresponds to a wireless link, and the corresponding node in the first row and that in the first column are just the nodes at the two ends of the wireless link. Moreover, from the relationship matrix, the information of the number of hops between two nodes can be directly obtained.

There are several options for the configuration of the node with management function:

The first option is central control, in which the base station is generally the unique management node for constructing the wireless network topology information structure of the group and taking charge of the update and communication of the information. But the possibility that some RS is designated as the management node in special cases is not ruled out.

The second option is distributed control, in which the base station is the management node for constructing the wireless network topology information structure of the group and taking charge of the update and communication of the information. In addition, a wireless relay station can be an agent node to manage the wireless communication sub-network subjected to the wireless relay station, and the nodes in the wireless communication sub-network comprise the agent node and one or more RSs accessing to the BS through the agent node, for example, RS2 at the left side can be an agent node to manage RS21.

The agent node constructs the wireless network topology information structure of the sub-network, takes charge of the update and communication of the information within the sub-network, and also needs to send the wireless network topology information of the sub-network to the base station, and then the base station updates the whole wireless communication network group.

In this case, the wireless network topology information structure of the sub-network constructed by agent node RS is similar to above-mentioned structure constructed by the base station, that is, it includes the information of nodes at two ends of wireless links in the wireless communication sub-network, and may further include the information of the number of hops between the two nodes. This structure can be described through the same way of above-mentioned basic relationship matrix.

For example, RS1 is a node having relay station RS11 subjected to it, thus it can manage such a relationship matrix by itself:

|      | RS1 | RS11 |
|------|-----|------|
| RS1  | 0   | 1    |
| RS11 | 1   | 0    |

The explanation of the information in this basic relationship matrix has been illustrated above, and will not be repeated.

Step 12, the management node updates the wireless network topology information of the group when the network topology relationship of the wireless communication network group changes;

A new RS joining in, handover of an existing RS, connection termination of an existing RS (the handover and termination of a RS can be unsolicitedly initiated by the management node or by RS), and so on, all may cause a change in the network topology relationship of the wireless communication network group. These processes generally need the participation of the management node, thus the management node can acquire the change information of the network topology relationship according to corresponding signaling. If these changes occur in a wireless communication sub-network administrated by an agent node, the agent node should report the updated topology relationship of the wireless communication sub-network to the management node, thereby the management node can update the original wireless network topology information of the wireless communication network group.

Step 13, the management node utilizes the wireless network topology information of the group and a corresponding strategy to manage the RSs or MSs subjected to it.

One example is: when a RS or terminal requests a handover from one RS to another RS within the group, the base station judges the number of hops of the target RS to which the handover is requested based on the network topology relationship, and if the number of hops exceeds to a specified threshold, such as 2, the request may be denied or another target node may be selected for the RS or terminal, which can avoid the long delay after the access. However, the present invention is not limited to this specific case of management, and in practice, there may be a lot of applications in management such as configuration, scheduling and handover.

The Second Scheme

Figure 3:
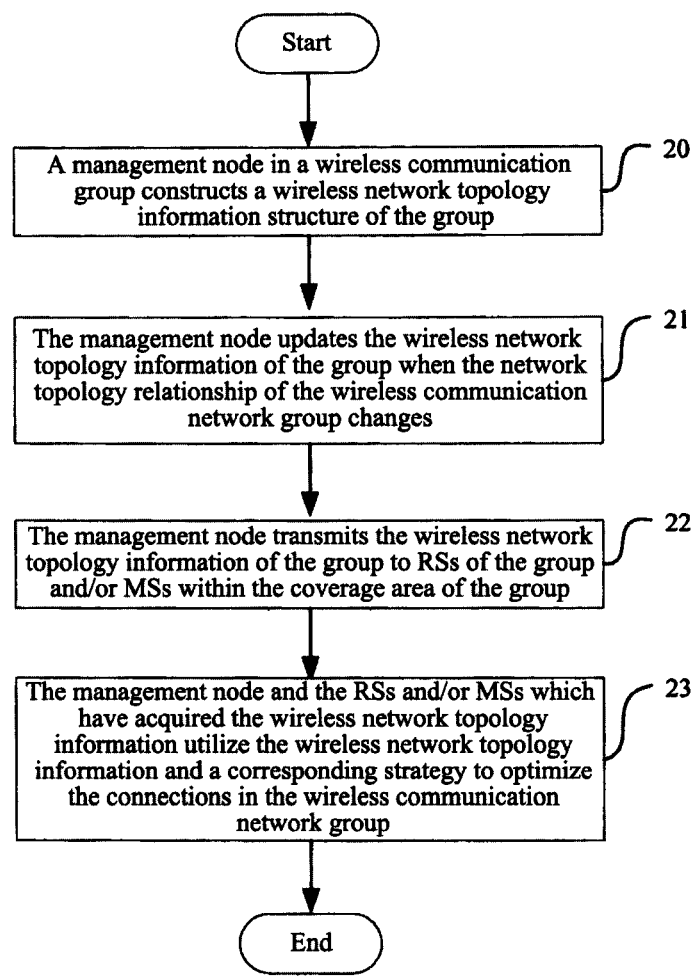

As shown in FIG. 3, the adaptive management method for a wireless communication network in this scheme comprises the following steps:

Step 20, a management node in a wireless communication network group constructs a wireless network topology information structure of the group;

Step 21, the management node updates the wireless network topology information of the group when the network topology relationship of the wireless communication network group changes;

The above two steps are the same as those in the first scheme.

Step 22, the management node transmits the wireless network topology information of the group to RSs of the group and/or MSs in the coverage of the group;

In this scheme, the management node transmit the wireless network topology information of the group to all the RSs in the group, but in other cases, the information may just be transmitted to part of the RSs, such as the RSs of agent nodes, or first-hop RSs.

Communication of the wireless topology relationship table can be implemented through the following methods: A. Add a configuration indication information unit in the existing downlink data indication message to indicate the position and size of the wireless network configuration information data such as the wireless network topology information and wireless links status information. B. Directly use a configuration indication message carrying configuration information such as the wireless network topology information and wireless links status information. The configuration information may be broadcasted to each node in the communication group. Each node in the communication group may also unsolicitedly request to acquire the configuration information of the wireless network.

Since a RS of an agent node can also constructs the wireless network topology information structure of a wireless communication sub-network, for the present invention, a RS may have the topology information of the whole wireless communication network group, or the topology information of the wireless communication sub-network, or no topology information at all.

When transmitting information, the management node may broadcast the wireless network topology information of the group in a broadcasting channel to facilitate RSs and MSs acquiring more information about the wireless communication network. Nodes in the wireless communication network group may ask the management node for the wireless link topology information and the management nodes provide the corresponding wireless link topology information according to the application.

Step 23, the management node and the RSs and/or MSs that have acquired the wireless network topology information optimize the connections in the wireless communication network group, utilizing the wireless network topology information and a corresponding strategy.

One example is: a RS may control the access of a new RS based on the network topology information of the whole wireless communication network group or that of the communication sub-network subjected to it, for example, when a RS at the second hop receives an access request from a new RS, it may reject the access.

Another example is, if a MS may acquire the network topology information from a broadcast message, it can determine the number of hops for the handover to a candidate RS based on the information, and if it is a third hop RS, the MS will not access to it even though its signal is the strongest, but select one from the RSs or BSs of the second hop or above whose signal is the strongest to perform the handover.

Similarly, the present invention is not limited to this specific case of management.

Obviously, the two management methods in the first scheme and the second scheme can be applied simultaneously, that is, the third and fourth steps in the second scheme can also be performed in the first scheme.

The Third Scheme

In this scheme, on the basis of the construction and update of the wireless network topology information, the link status information of wireless links is further detected, recorded and updated, and based on the wireless links status, wider and more effective management is carried out.

Figure 4:
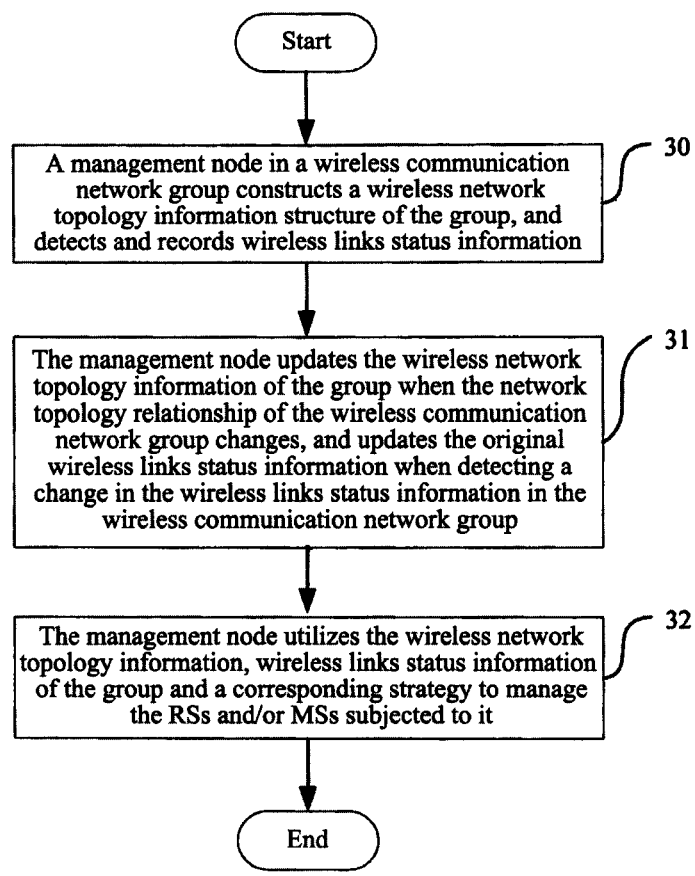

As shown in FIG. 4, the method of this scheme comprises the following steps:

Step 30, a management node in a wireless communication network group constructs a wireless network topology information structure of the group, and detects and records wireless links status information;

The wireless links status information may comprise channel interference/noise ratio (CINR), wireless link package loss/error rate, delay of the processing and communication in the wireless links, the actual throughput of each wireless link and the resource configured for the wireless links, and so on. One or any combination of these parameters may be adopted, and other parameters may also be adopted.

The wireless links status information can be obtained through the following two methods:

1) Obtain the information based on detection result of service signal, for a wireless link directly connecting to the management node (the base station generally), the management node can detect the relative parameters of the uplink link status, and requests the node at the other end to report the relative parameters of the downlink status (reporting method such as periodical reporting or event triggering reporting may be adopted); for the link status between other nodes, the node of the previous hop obtains the information with an identical method and reports it to the management node.

2) Obtain the information based on the detection result of test signal, the management node (generally the base station) designates one or more nodes in the topology to send one or a series of test signals, and meanwhile designates other nodes to cooperate for the test and return the test results to the node sending the signals or directly to the management node. The node sending the signals or the management node acquires the status information of the relative wireless links based on the detection result, and if the node sending the signals is not a management node, it should report the updated wireless links status information to the management node.

In this case, multiple detection methods may be utilized, for example, after the initial access of a new RS, the management node designates the RS to send test signals, and designates other RSs to cooperate for the detection and return the test results (such as strength of the RS test signals received, signal to noise ratio, and so on) to the base station, and the management node can acquire the status of the relative links through analysis, and judge whether the access node of the RS should be adjusted according to the topology relationship and the status of the wireless links.

An alternative is, when the network is comparatively idle, the management node chooses the base station and all the RSs accessed to by some other RSs to send above-mentioned test signals and designates the nodes at the other ends within the topology relationship to cooperate for the test and return the test results, and this can guarantee that status of each wireless link in the topology can be tested. The management node analyzes and updates the wireless links status information in the wireless communication network group based on the test results, and adjusts the connection relationship of the wireless communication network according to the current wireless network topology information and the new wireless links status information.

Step 31, the management node updates the wireless network topology information of the group when the network topology relationship of the wireless communication network group changes, and updates the original wireless links status information when detecting a change in the wireless links status information in the wireless communication network group;

The update of the network topology relationship may be independent of the update of the wireless links status information. The update of the wireless links status information can also be performed according to the two methods described above, that is, the update is performed after obtaining the wireless links status information based on detection result of the service signal or the update is performed after obtaining the wireless links status information based on detection result of the test signal.

Step 32, the management node manages the RSs and/or MSs subjected to it, utilizing the wireless network topology information, wireless links status information of the group and a corresponding strategy.

In this scheme, with the obtained wireless links status information, the management node carries out a more rational and intelligent management, which will be described through the following examples:

After a detection, if the base station finds that a first-hop RS is too busy, it may designate the second-hop RS subjected to the first-hop RS to hand off to another first-hop RS, which is an adaptive load balancing operation.

When a RS initially accesses to a first-hop RS, generally, it selects a RS with the strongest signal, then if the base station finds that the link status between the first-hop RS and the base station is too bad, for example, too crowded, the base station may let the RS to hand off to another RS whose signal might not be the strongest, but the quality of the link on the whole path is better.

When a RS needs a handover, the base station or a RS as an agent node may perform a weighted computation based on the status of the multiple wireless links on the path, according to the wireless network topology information and wireless links status information, to select a target node with the best quality of service (QoS) for the RS.

The Fourth Scheme

Figure 5:
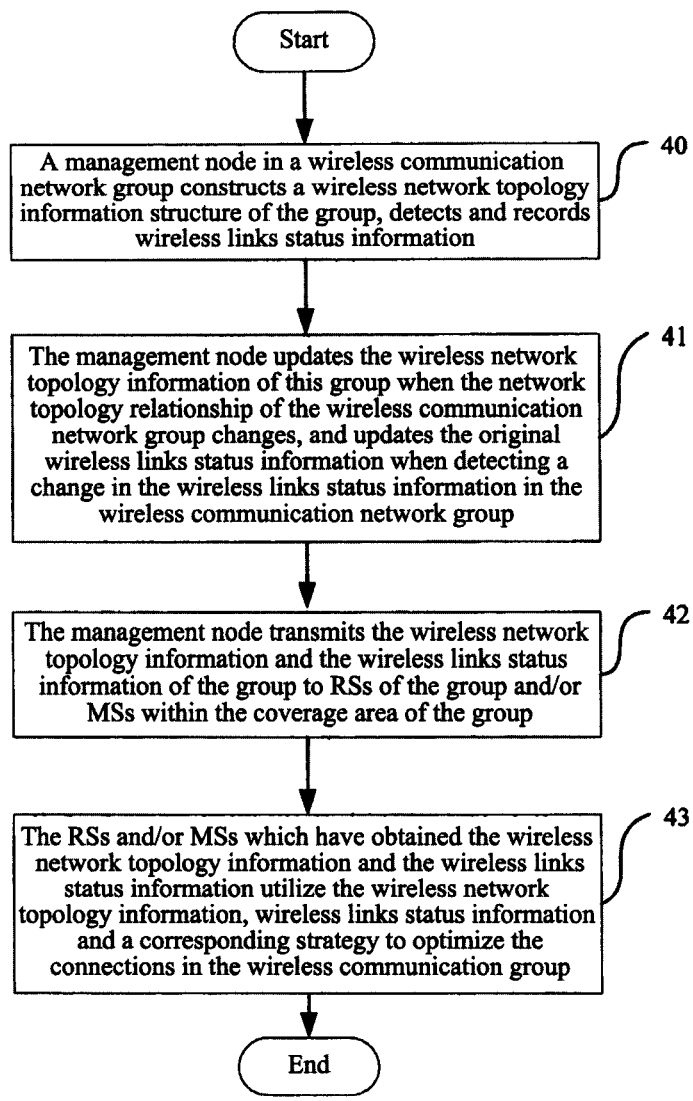

As shown in FIG. 5, the adaptive management method for a wireless communication network in this scheme comprises the following steps:

Step 40, a management node in a wireless communication network group constructs a wireless network topology information structure of the group, detects and records wireless links status information;

Step 41, the management node updates the wireless network topology information of this group when the network topology relationship of the wireless communication network group changes, and updates the original wireless links status information when detecting a change in the wireless links status information in the wireless communication network group;

The above two steps are the same as those in the third scheme.

Step 42, the management node transmits the wireless network topology information and the wireless links status information of the group to the RSs of the group and/or the MSs in the coverage of the group;

The management node may transmit the wireless network topology information and the wireless links status information of the group to all the RSs of the group or just part of the RSs, such as first-hop RSs or RSs accessed to by some other RSs. The management node may also broadcast the wireless network topology information and wireless links status information of the group in a broadcasting channel, and the MSs may receive the information before the access. In addition, nodes in the wireless communication network group may ask the management node for the wireless links status information, and the management node provides the corresponding wireless links status information according to the application.

Step 43, the RSs and/or MSs which have obtained the wireless network topology information and the wireless links status information optimize the connections in the wireless communication group, utilizing the wireless network topology information, wireless links status information and a corresponding strategy.

Here, in the control of the access of a new RS or MS, a RS may also take the relative wireless links status into consideration, besides the number of hops, thus may perform the control more rationally, and the third scheme may be referred to. So is the case in the update of the wireless links, the number of hops and the wireless links status may both be considered for the selection of a target node.

Obviously, the two management methods in the third scheme and the fourth scheme can be applied simultaneously, that is, the third and fourth steps in the third scheme can also be performed in the fourth scheme.

In addition, in any one of the above schemes, management nodes of adjacent wireless communication network groups may exchange the wireless network topology information and wireless links information of the respective wireless communication network groups, and during a handover of a RS, when the RS detects a node in an adjacent cell, the base station can select a node which meets the requirement of QoS as the target node more accurately according to the topology information and the wireless links status information of the communication network group to which the node in the adjacent cell belongs.

The exchange between the management nodes may comprise the following situations:

1) A management node unsolicitedly notifies an adjacent base station when there is an update in the topology relationship (wireless links status information may be included) of the wireless communication network group.

2) A management node unsolicitedly requests the management node in an adjacent cell to provide the wireless network topology information (wireless links status information may also be included) of the adjacent cell.

A management node may further transmit the wireless network topology information and wireless links status information of adjacent cells to all or part of the RSs in the group, so when these RSs detect a signal from the adjacent cells during a handover, they can also select a node which meets the requirement of QoS as the target node more accurately.

Embodiments of a wireless relay station RS joining a communication network group in accordance with the present invention will be described below.

The process can be implemented through the following embodiments:

The First Embodiment

Figure 6:
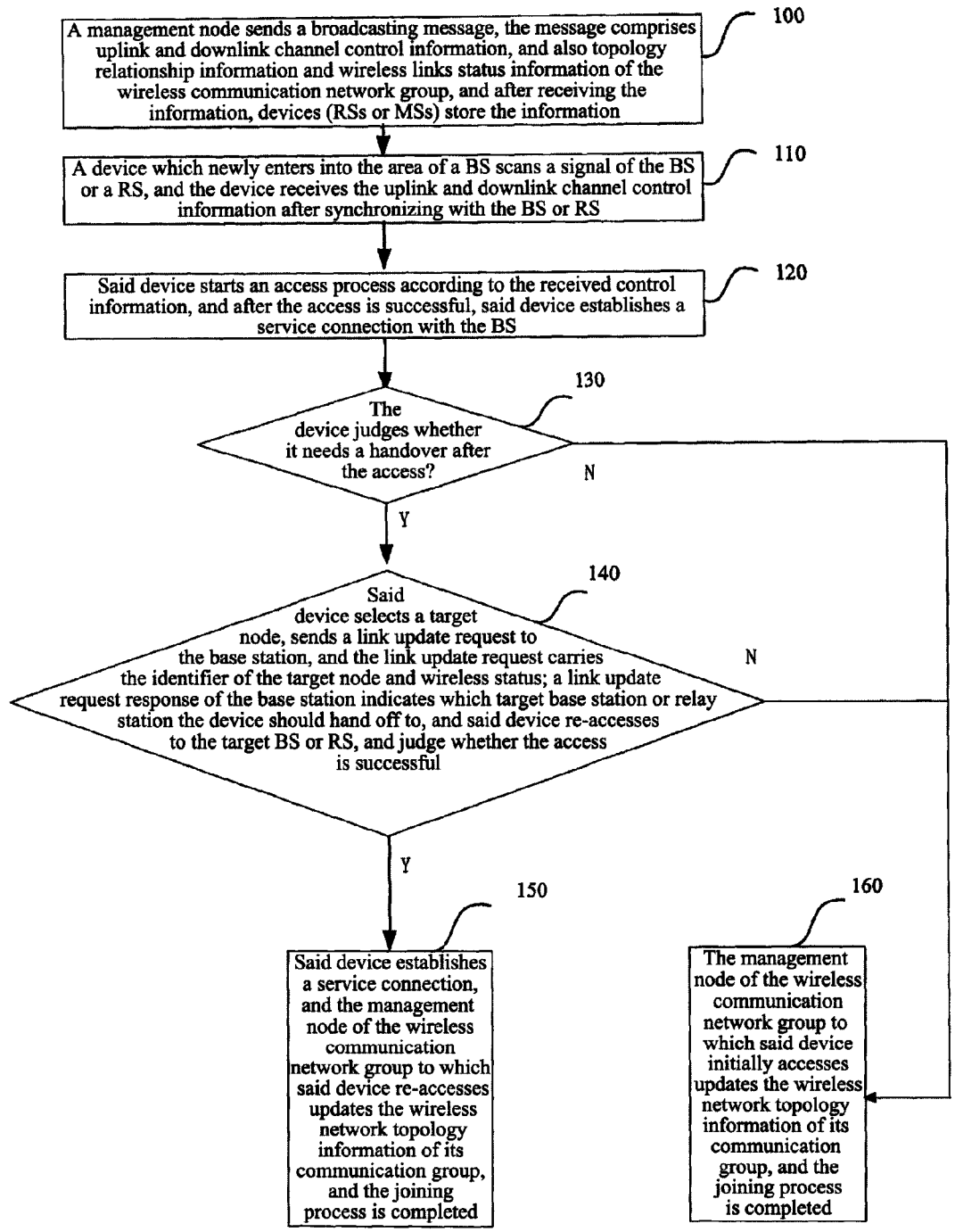
FIG. 6~FIG. 10 are five illustrations of the method for a RS joining a wireless communication network group in accordance with the present invention.

In this embodiment, after an access, a device performs a handover according to its acquired topology relationship information and wireless links status information, and the topology relationship of the wireless communication network group is updated after the handover, and the joining process is completed. As shown in FIG. 6, Step 100, a management node sends a broadcasting message, the message comprises uplink and downlink channel control information, and also topology relationship information and wireless links status information of the wireless communication network group, and after receiving the information, devices (RSs or MSs) store the information.

In this broadcasted channel control information, the base station may separately describe the control information sent to a relay station and the control information sent to a terminal. And the topology relationship information and wireless links status information may be carried in an added new message field in an existing broadcasting message, such as DCD message in IEEE802.16 air interface protocol or may be carried in a new broadcasting message, such as a wireless topology broadcasting message.

Step 110, a device which newly enters into the area of a BS scans a signal of the BS or a RS, and the device receives the uplink and downlink channel control information after synchronizing with the BS or RS;

The area subjected to the BS includes the coverage area extended by the RSs in the group.

Step 120, said device starts an access process according to the received control information, and after the access is successful, said device establishes a service connection with the BS;

The newly joined device may directly access to the BS or the access may be implemented through one or more intermediate RSs. So is the case in the following several schemes.

Step 130, after the access, the device may judge whether it needs a handover based on information of the wireless communication network group (including wireless network topology information, or wireless network topology information together with wireless links status information) and information of adjacent cells (topology relationship information and wireless links status information of the wireless communication network groups of the adjacent cells may be included, optional), if the handover is needed, proceeds to step 140, while if the handover is not needed, proceeds to step 160;

The strategy here may be, for example, selecting, from the nodes whose hop number is not larger than 2, the node whose wireless link's quality is the best as the target node; that the wireless link's quality is the best may be the weighted average result of the multiple wireless links on the path to the base station.

Step 140, said device selects a target node, sends a link update request to the base station, and the link update request carries the identifier of the target node and wireless status. After the base station receives the request, based on the wireless communication topology information, wireless links status information of the group, information of adjacent cells (wireless network topology information and/or wireless links status information of the wireless communication network groups of the adjacent cells may be included, optional) and a corresponding strategy, the base station feeds back a link update request response to indicate which target base station or relay station the device should hand off to, and said device re-accesses to the target BS or RS, establishes a service connection after the access is successfully completed, and proceeds to step 150, while if the access fails, proceeds to step 160.

Here, the target BS or RS may be in the same wireless communication network group with the initial access or may be a BS or RS in another wireless communication network group.

Step 150, the management node of the wireless communication network group to which said device re-accesses updates the wireless network topology information of its communication group, and the joining process is completed;

Step 160, the management node of the wireless communication network group to which said device initially accesses updates the wireless network topology information of its communication group, and the joining process is completed;

The concrete process of step 150 and step 160 may further divide into the following cases:

If said device accesses to a RS, and the RS is an agent node, the RS needs to update the wireless network topology information of the sub-network subjected to it, and reports to the management node, and the management node updates the wireless network topology information of its wireless communication network group;

If said device accesses to a RS, and the RS is not an agent node, the RS directly reports to the management node, and the management node updates the wireless network topology information of its wireless communication network group;

If said device accesses to a BS, and the BS is a management node, the BS may directly update the wireless network topology information of its communication group;

If said device accesses to a BS, and the BS is not a management node, the BS needs to report to the management node, and the management node updates the wireless network topology information of its wireless communication network group;

The above cases may also exist in other embodiments.

After the management node of a wireless communication network group updates the wireless network topology information, it may transmit the information to other nodes. Afterwards, the management node of the wireless communication network group performs an update after obtaining newly added wireless links status information and may further transmit the information to other nodes.

The Second Embodiment

Figure 7:
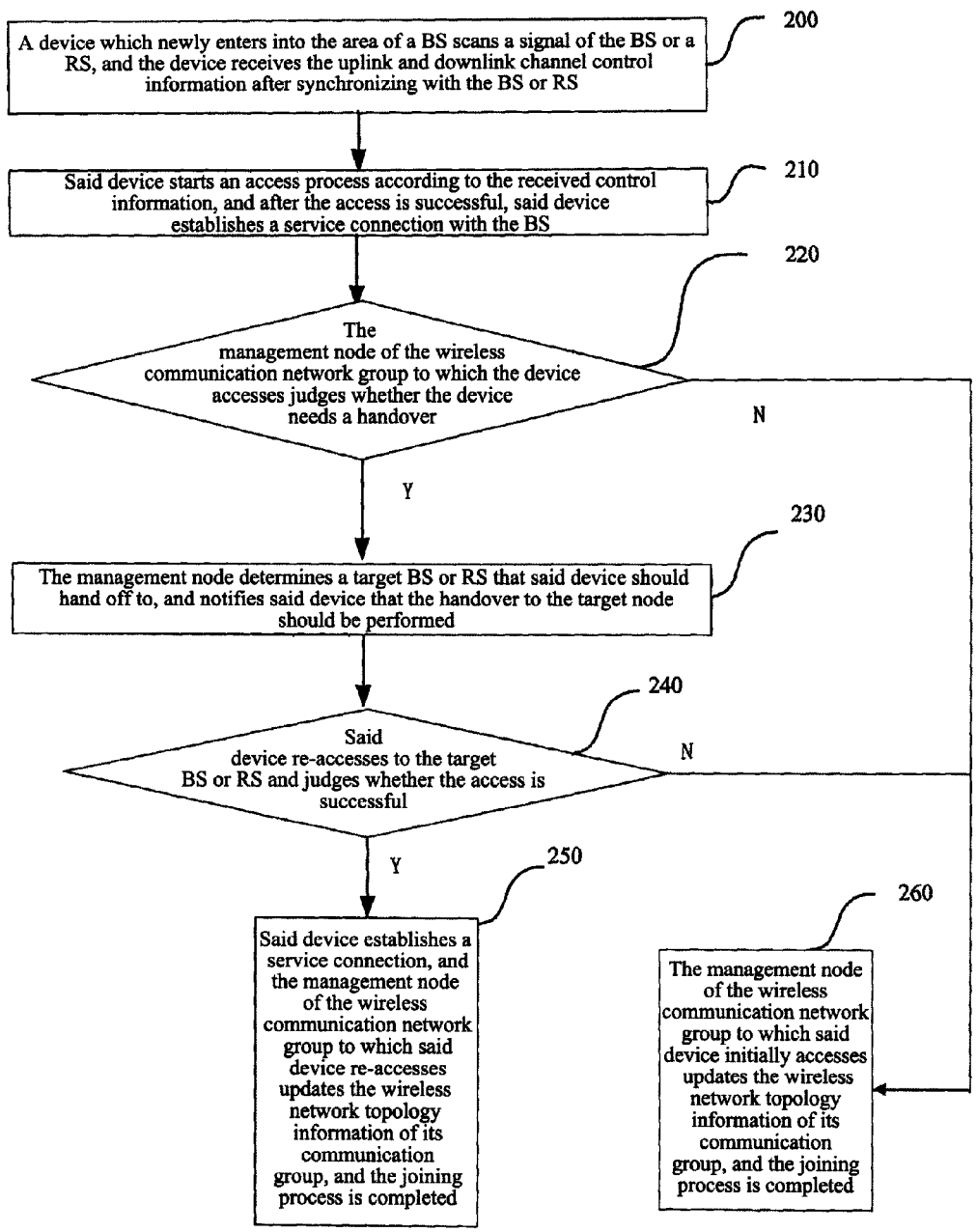

In this embodiment, after the access of a device, the management node of the wireless communication network group to which the device accesses judges whether the device needs a handover based on the network topology information and wireless links status information, if the handover is needed, the network topology information is updated after the handover, and the joining process is completed. As shown in FIG. 7, Step 200, a device which newly enters into the area of a BS scans a signal of the BS or a RS, and receives uplink and downlink channel control information after synchronizing with the BS or RS;

Step 210, said device starts an access process according to the received control information, and after the access is successfully completed, said device establishes a service connection with the BS;

Step 220, the management node of the wireless communication network group to which the device accesses judges whether the device needs a handover based on a stored information of the wireless communication network group (including the wireless network topology information, or the wireless network topology information together with the wireless links status information), information of adjacent cells (optional) and a preset corresponding strategy, if the handover is needed, proceeds to step 230, otherwise proceeds to step 260;

If the base station is not the management node, it needs to notify the management node of the node to which the device accesses.

Step 230, the management node determines a target BS or RS that said device should hand off to, and notifies said device that the handover to the target node should be performed.

Step 240, said device re-accesses to the target BS or RS, and after the access is successfully completed, proceeds to step 250, while if the access fails, proceeds to step 260.

Step 250, said device establishes a service connection, and the management node of the wireless communication network group to which said device re-accesses updates the wireless network topology information of its communication group, and the joining process is completed.

Step 260, the management node of the wireless communication network group to which said device initially accesses updates the wireless network topology information of its communication group, and the joining process is completed.

After the management node of a wireless communication network group updates the wireless network topology information, it may transmit the information to other nodes. Afterwards, the management node of the wireless communication network group performs an update after obtaining newly added wireless links status information and may further transmit the information to other nodes.

Similarly, the management node might just keep the topology relationship information of the wireless communication network group; in this case, it is merely needed to delete the "wireless links status information" in the above process, and an identical process can be applied.

The Third Embodiment

Figure 8:
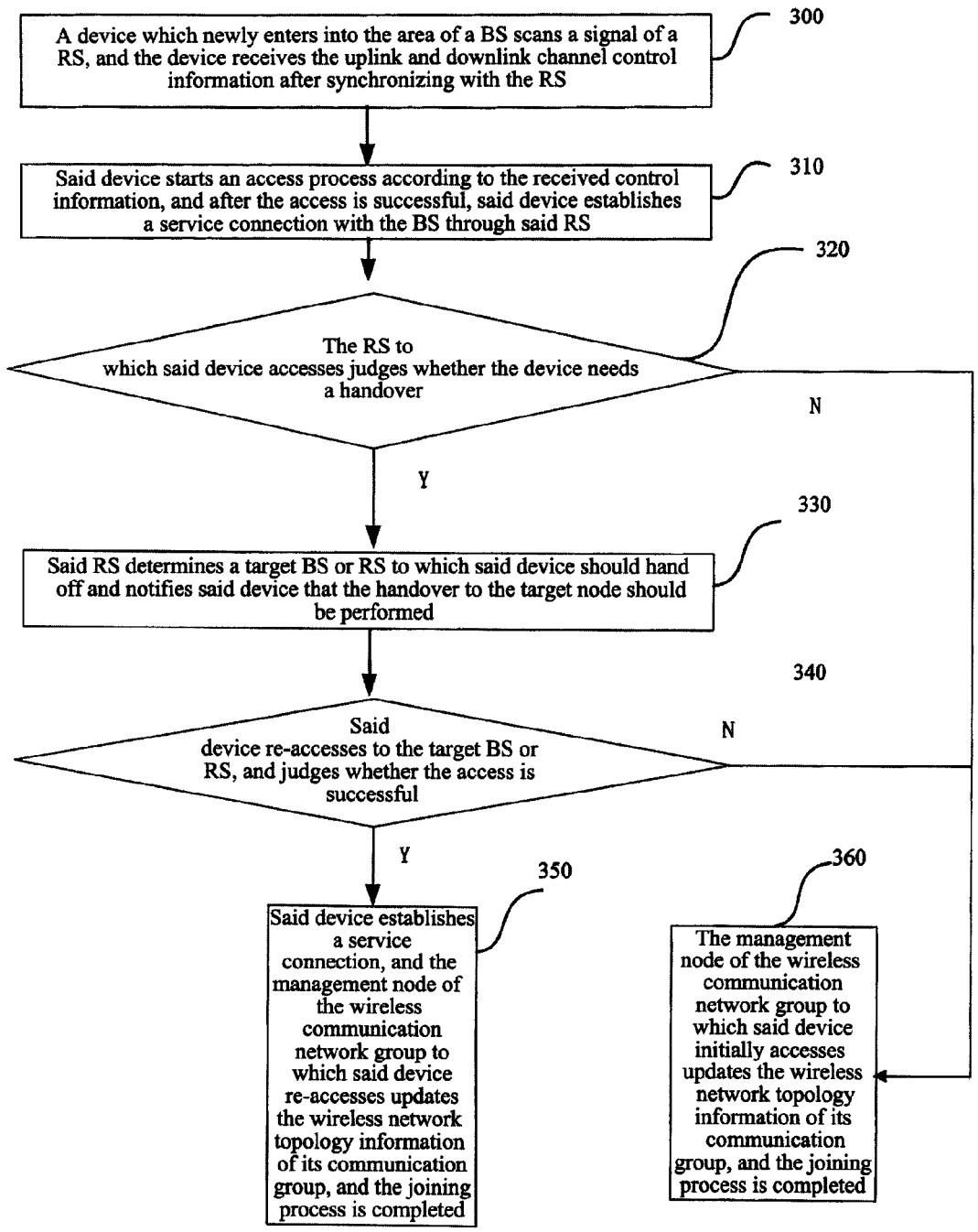

In this embodiment, after the access of a device, a RS of the wireless communication network group to which the device accesses judges whether the device needs a handover based on the network topology information and wireless links status information, if the handover is needed, the network topology information is updated after the handover, and the joining process is completed, as shown in FIG. 8.

The premise of this embodiment is: the management node transmits the topology relationship information and wireless links status information of the whole wireless communication network group to the RS to which the device accesses, that is, the RS keeps the information. Or the RS keeps the topology relationship information and wireless links status information of its communication sub-network.

Step 300, a device which newly enters into the area of a BS scans a signal of a RS, and receives uplink and downlink channel control information after synchronizing with the RS;

Step 310, said device starts an access process according to the received control information, and after the access is successfully completed, said device establishes a service connection with the BS through said RS;

Step 320, the RS to which said device accesses judges whether the device needs a handover based on the kept information (including the wireless network topology information, or the wireless network topology information together with the wireless links status information, or the wireless network topology information of the communication sub-network, or the wireless network topology information together with the wireless links status information of the communication sub-network), information of adjacent cells (optional) and a preset corresponding strategy, if the handover is needed, proceeds to step 330, otherwise proceeds to step 360;

The topology relationship information and wireless links status information in the above step may belong to the whole communication network group or to the sub-network of the RS.

Step 330, said RS determines a target BS or RS to which said device should hand off and notifies said device that the handover to the target node should be performed.

Step 340: said device re-accesses to the target BS or RS, and after the access is successfully completed, said device establishes a service connection, and proceeds to step 350, while if the access fails, proceeds to step 360.

Step 350: the management node of the wireless communication network group to which said device re-accesses updates the wireless network topology information of its communication group, and the joining process is completed.

Step 360: the management node of the wireless communication network group to which said device initially accesses updates the wireless network topology information of its communication group, and the joining process is completed.

After the management node of a wireless communication network group updates the wireless network topology information, it may transmit the information to other nodes. Afterwards, the management node of the wireless communication network group performs an update after obtaining newly added wireless links status information and may further transmit the information to other nodes.

The Fourth Embodiment

Figure 9:
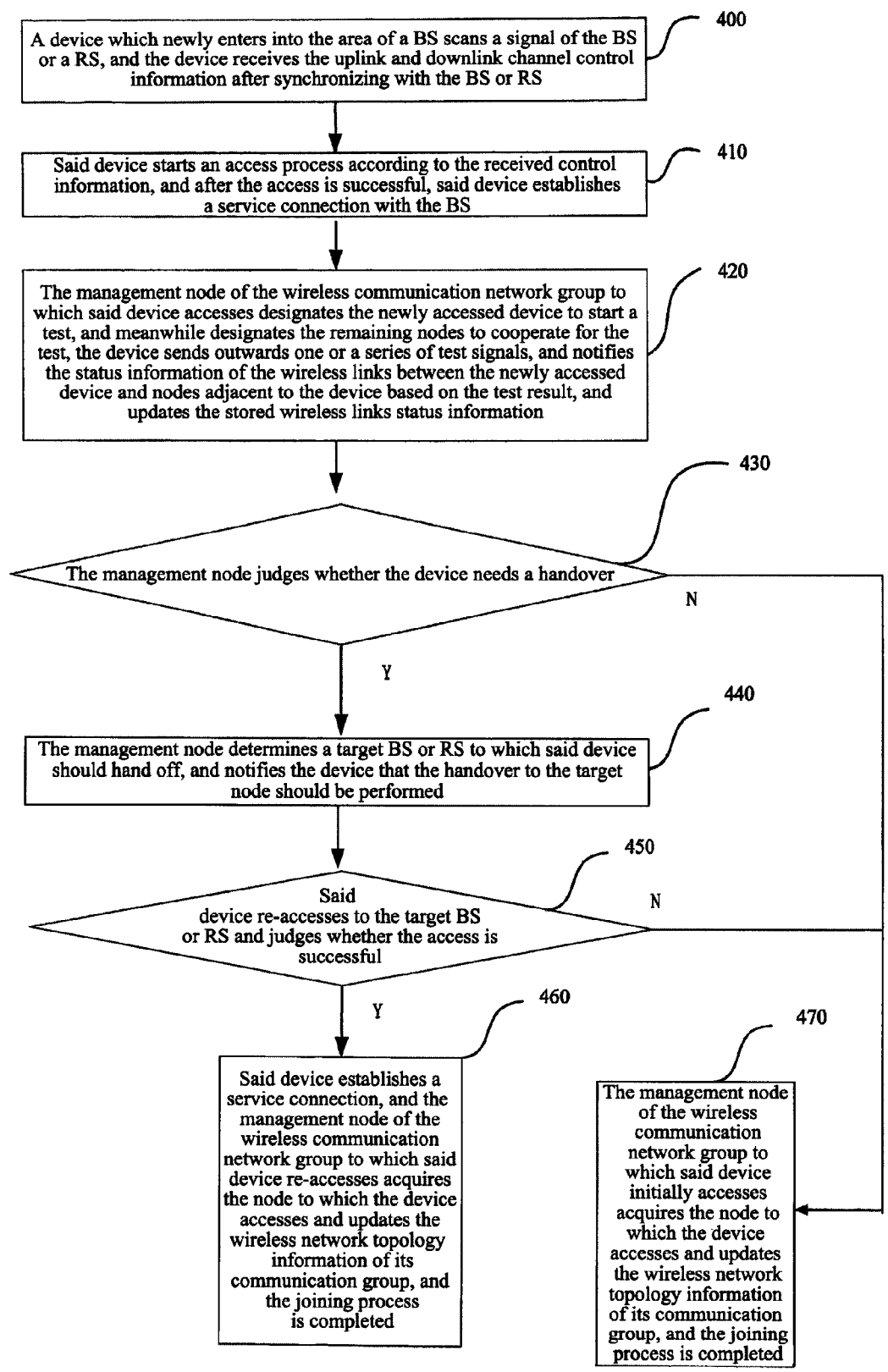

In this embodiment, after the access of a device, the management node of the wireless communication network group to which the device accesses judges whether the device needs a handover based on the network topology information and real-time detected wireless links status information, and if the handover is needed, the network topology information is updated after the handover, and the joining process is completed. As shown in FIG. 9, Step 400, a device which newly enters into the area of a BS scans a signal of the BS or a RS, and receives uplink and downlink channel control information after synchronizing with the BS or RS;

Step 410, said device starts an access process according to the received control information, and after the access is successfully completed, said device establishes a service connection with the BS;

Step 420, the management node of the wireless communication network group to which said device accesses designates the newly accessed device to start a test, and meanwhile designates the remaining nodes to cooperate for the test, the device sends outwards one or a series of test signals, for instance, the test signal is received and the measurement situation is fed back, such as strength of the signal, signal to noise ratio and delay, the management node is notified of the result, and the management node acquires the status information of the wireless links between the newly accessed device and nodes adjacent to the device based on the test result, and updates the stored wireless links status information.

Step 430, the management node judges whether the device needs a handover based on information of the wireless communication network group (including stored topology relationship information, real-time detected wireless links status information), information of adjacent cells (optional) and a preset corresponding strategy, and if the handover is needed, proceeds to step 440, otherwise proceeds to step 470;

Step 440, the management node determines a target BS or RS to which said device should hand off, and notifies the device that the handover to the target node should be performed.

Step 450, said device re-accesses to the target BS or RS, and after the access is successfully completed, said device establishes a service connection, and proceeds to step 460, while if the access fails, proceeds to step 470.

Step 460, the management node of the wireless communication network group to which said device re-accesses acquires the node to which the device accesses and updates the wireless network topology information of its communication group, and the joining process is completed.

Step 470, the management node of the wireless communication network group to which said device initially accesses acquires the node to which the device accesses and updates the wireless network topology information of its communication group, and the joining process is completed.

After the management node of a wireless communication network group updates the wireless network topology information and the wireless links status information, it may transmit the information to other nodes. And before the communication, the status information of wireless links which are non-existent after a detection may be discarded.

Real-time detection is performed in this embodiment, thereby the latest wireless links status information can be acquired, which will facilitate a more accurate handover judgment.

The Fifth Embodiment

Figure 10:
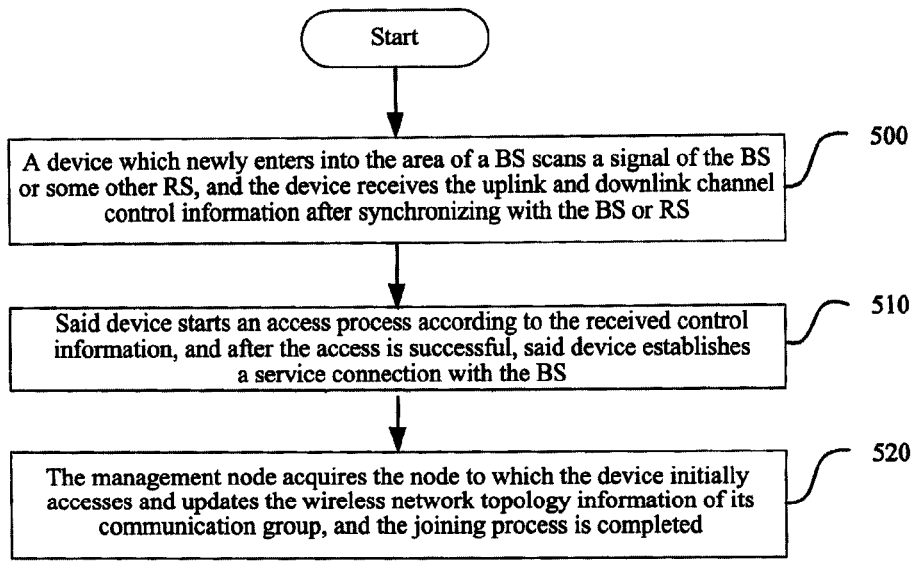

In this embodiment, there is no handover judgment after the access of a device, and the topology information of the wireless communication network group is directly updated, and the joining is completed. As shown in FIG. 10, Step 500, a device which newly enters into the area of a BS scans a signal of the BS or some other RS, and receives uplink and downlink channel control information after synchronizing with the BS or RS;

Step 510, said device starts an access process according to the received control information, and after the access is successfully completed, said device establishes a service connection with the BS;

Step 520, the management node acquires the node to which the device initially accesses and updates the wireless network topology information of its communication group, and the joining process is completed.

After the management node of the wireless communication network group updates the wireless network topology information, it may transmit the information to other nodes. Afterwards, the management node of the wireless communication network group may further update and transmit the wireless links status information.

Embodiments of updating the connection relationship of a wireless relay station in accordance with the present invention will be described below.

Generally, after a RS joins a communication group, the RS will receive information of adjacent cells sent by the BS, and it monitors the relative adjacent cells unsolicitedly or according to the demand of the BS, and reports the monitoring result to the BS, and the result includes information of the downlink wireless channel status of each adjacent cell monitored by the RS.

The update of a connection relationship (also called handover hereinafter) may be initiated by a BS or a RS. The terminals, wireless relay stations and the base station might face the following situations:

(1) Wireless relay station RSx and all the RSs and terminals connecting to RSx as a whole entirely transfer to a new communication group or other nodes in the same communication group. In this case, it is merely needed that RSx acts as a representative to perform message interaction with the base station;

(2) Only the wireless relay station RSx transfers, and the associated RSs and terminals connecting to RSx determine whether handovers are performed based on the wireless condition detected by them.

In addition, in the process of updating a connection between a base station and a wireless relay station, an important issue to be solved is how to guarantee the service continuity of all the associated wireless relay stations and terminals connecting to the RS.

The First Scheme

Figure 11:
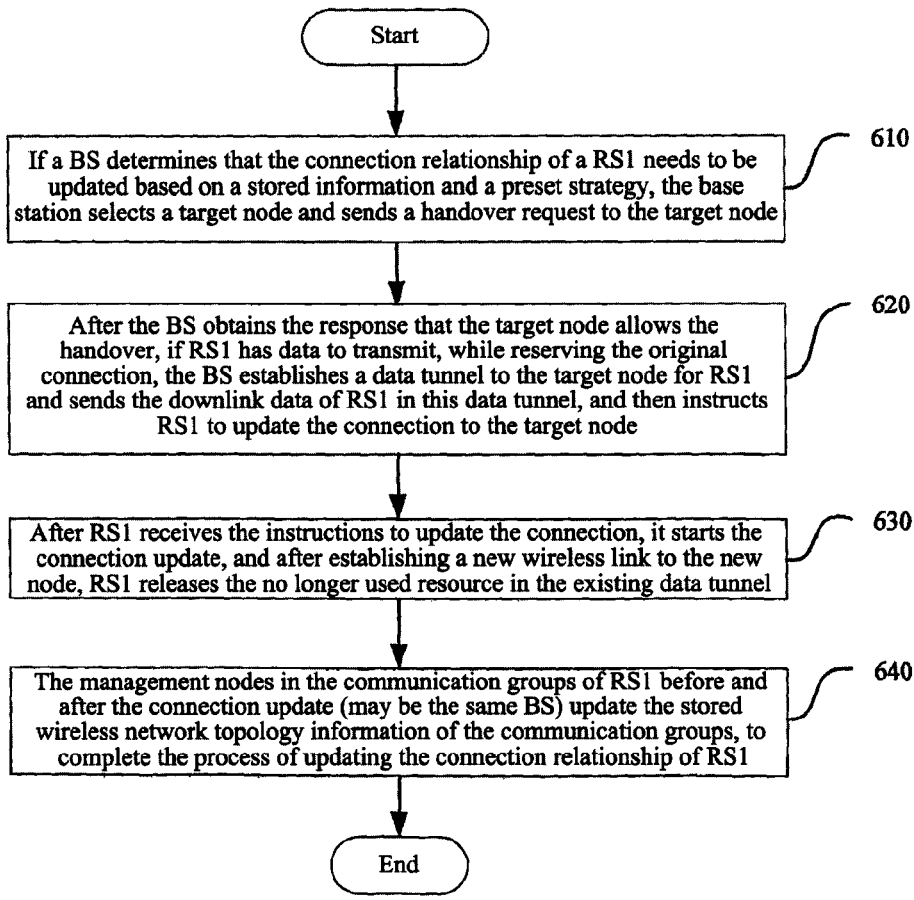
FIG. 11~FIG. 12 are two illustrations of the method for updating the connection relationship of a RS in accordance with the present invention.

In this scheme, the base station unsolicitedly initiates a connection relationship update, as shown in FIG. 11, flow of the scheme comprises the following steps:

Step 610, if a BS determines that the connection relationship of a RS1 needs to be changed based on a stored information and a preset strategy, the base station selects a target node and sends a handover request to the target node;

There is a plurality of triggering modes for the BS to unsolicitedly request the RS to update its connection relationship: such as, a. the need for coverage, b. the need for load balancing, c. the need for increasing the throughout, d. the need for improving the service quality, e. the need for the network management by an operator, and so on.

The stored information, base on which the above determination is made, may comprise one or more pieces of the following information: the network topology relationship information of the group, the wireless links status information of the group, the network topology relationship information of adjacent wireless communication network groups, the wireless links status information of adjacent wireless communication network groups, information of adjacent cells reported by the RS, and so on. When judging whether the triggering condition corresponding to an above-mentioned triggering mode is met and when selecting the target node, the judgment of the network topology relationship information and wireless links status information of the communication group and adjacent communication groups created and stored in the present invention may be taken as a basis, thereby, a foundation is provided for a better judgment and selection.

Above-mentioned target node may be the BS or a RS in the local wireless communication network group, or a node in other wireless communication network groups. Sending the handover request to the target node is to further guarantee the success of the subsequent access of RS1, and avoid the service suspension due to access failure.

Step 620, after the BS obtains the response that the target node allows the handover, if RS1 has data to transmit, while reserving the original connection, the BS establishes a data tunnel to the target node for RS1 and sends the downlink data of RS1 in this data tunnel, and then instructs RS1 to update the connection to the target node;

The link from node A to node B is defined as a data tunnel in this specification, and the data tunnel may be wireless based or may be wireless-wired hybrid. Establishment, modification and deletion of a tunnel need to be based on the wireless network topology information and wireless links status information. By firstly establishing a data tunnel to the target node, the time period of service suspension of other RSn and terminals connecting to RS1 can be shortened.

For the update of a link across communication groups, the tunnel can be established according to the following modes:

The first mode is: if the target node is another base station, the data node at the network side→the base station of RS1 before the handover→the target base station; if the target node is a RS connecting to another base station, the data node at the network side→the base station of RS1 before the handover→the base station of the target RS→the target RS.

A wireless-wired hybrid data tunnel is established here, and the downlink data is sent to RS1 by the base station of RS1 before the handover through the original data tunnel, and meanwhile, the downlink data is duplicated and sent to the base station of the target node to which RS1 should hand off. After the tunnel is established, the target node sends data to RS1, and the data can be received by RS1 after RS1 accesses to the target node.

The second mode is: if the target node is another base station, the data node at the network side→the target node; if the target node is a RS connecting to another base station, the data node at the network side→the base station of the target RS→the target RS.

In this mode, the downlink data of RS1 is directly sent from the data node at the network side to the base station of the target node, and will not be forwarded by the original base station.

The third mode is: the data node at the network side→the BS to which RS1 accesses before the handover→the RS to which RS1 accesses before the handover→the target RS or target BS.

In the case that RS1 accesses to a RS, in this mode, the original data tunnel is utilized and a link from the RS to which RS1 accesses to the target node is added, which is to establish a wireless data channel, and there is no need of passing the wired connection between the base stations.

For the update of a link within the local wireless communication group, the tunnel is established according to the following modes:

The first mode is: the data node at the network side→the base station of RS1→the target RS.

That is, the downlink data is sent to RS1 by the base station through the original data tunnel, and meanwhile, the downlink data is duplicated and sent to the target RS to which RS1 should hand off.

The second mode is: the data node at the network side→the RS to which RS1 accesses before the handover→the target RS.

In this mode, the original data tunnel is also utilized, and a link from the source RS to the target RS is added as the new data tunnel.

In this mode, when RS1 hands off from the RS to which RS1 accesses to the BS in the group, the data tunnel from the data node at the network side to the BS in the communication group of RS1 has already existed, and there is no need of re-establishment.

When establishing the data tunnel to the target node, the base station of RS1 before the handover or the network side needs to send the wireless connection attributes corresponding to RS1 (such as the QoS requirement of the link, the security information, and so on) to the BS of the target node. Furthermore, the base station of RS1 before the handover, or the RS working as the agent node in the communication sub-network of RS1, or the network side may send the attributes of RS1 and the RSs and terminals connecting to RS1 (such as the capability of the RSs and terminals) to the BS of the target node or the RS working as the agent node in the communication sub-network of the target node, so that during the link handover of RS1 and the RSs and terminals connecting to RS1, the relative interaction process can be omitted, thereby, the access time can be reduced, and the re-access process can be speeded up.

Similarly, the RSs or terminals may synchronize with possible adjacent base stations or adjacent RSs in advance and store this synchronization information. Once these RSs and terminals connecting to RS1 receive instructions to update the connections, they may, according to information of the instructions, find the synchronization information of the target node from its stored target base station/RS information, and synchronize with the target node and establish wireless network connections as soon as possible.

Step 630, after RS1 receives the instructions to update the connection, it starts the connection update, and after establishing a new wireless link to the new node, RS1 releases the no longer used resource in the existing data tunnel;

After RS1 accesses to the target node, it transmits data through the established data tunnel to the target node, and if the original data tunnel of RS1 has some part not coinciding with this data tunnel, it releases the unutilized resource of this part.

In some cases, it is also possible that RS1 does not hand off to the target node in accordance with the requirement of the base station, but hands off to another node selected by it. In this case, the base station needs to demolish the established data tunnel. The present invention does not exclude this possibility.

Step 640, the management nodes in the communication groups of RS1 before and after the connection update (may be the same BS) update the stored wireless network topology information of the communication groups, to complete the process of updating the connection relationship of RS1.

After the management node updates the wireless network topology information, it may update the wireless links status information according to a corresponding strategy, and transmit the information to other nodes in the local group or adjacent wireless communication network groups.

The above flow is the case considering that the terminals or RSs connecting to RS1 transfer entirely with RS1, which is suitable for a connection relationship update not only when RS1 is static but also when RS1 and the terminals and RSs connecting to RS1 move together.

Above-mentioned connection relationship update can be the connection relationship update of a RS in a communication sub-network unsolicitedly initiated by the RS working as the agent node of the sub-network, whose flow is basically identical with the above flow, it is merely needed to replace the BS initiating the handover with the RS. In addition, after the connection relationship is updated, the RS working as the agent node need to update the network topology relationship information of the local communication sub-network.

The Second Scheme

Figure 12:
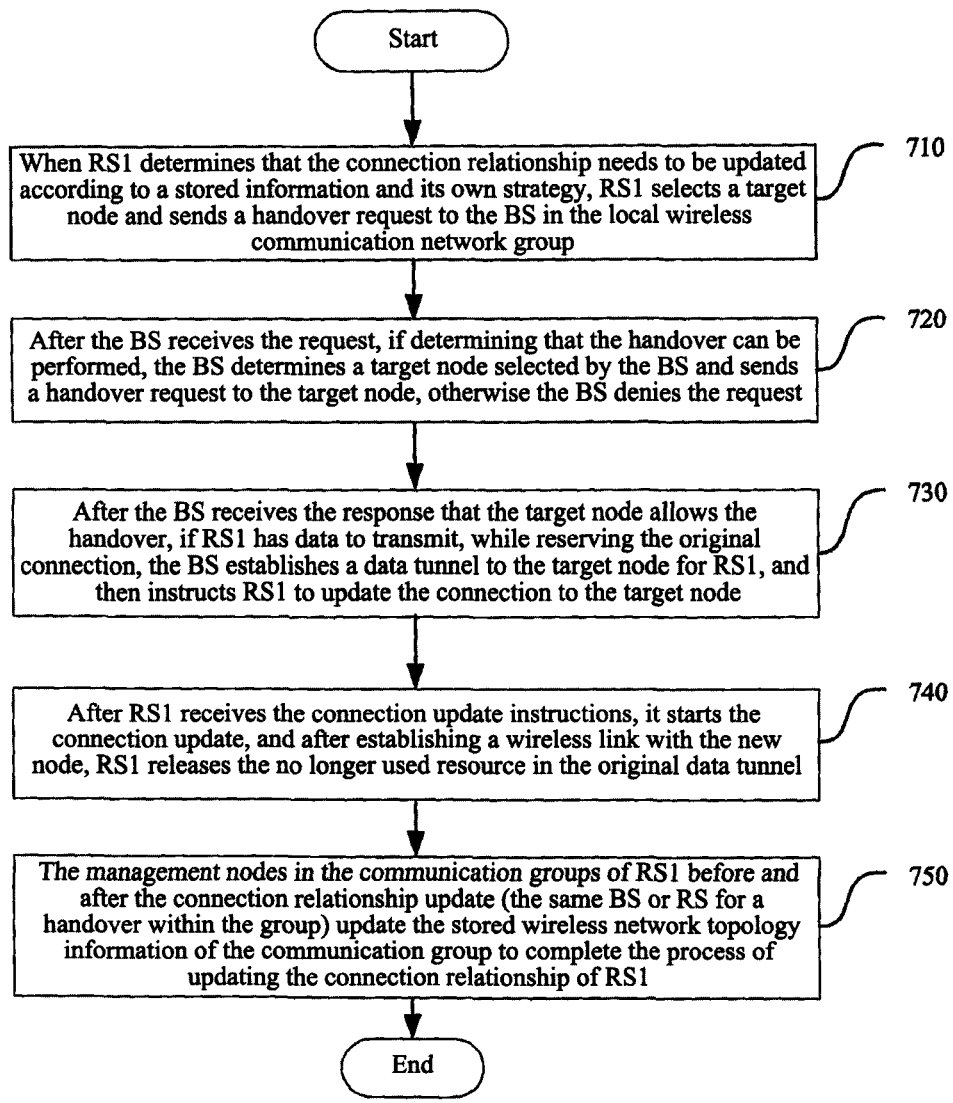

In this scheme, a wireless relay station unsolicitedly initiates a connection relationship update, and as shown in FIG. 12, the scheme comprises the following steps:

Step 710, when RS1 determines that the connection relationship needs to be updated according to a stored information and its own strategy, RS1 selects a target node and sends a handover request to the BS in the local wireless communication network group;

The target node may be a RS or the BS in the local wireless communication network group or a RS or the BS in another wireless communication network group.

The stored information, based on which RS1 makes the determination, may comprise one or more pieces of the following information: the network topology relationship information of the local wireless communication network group, the wireless links status information of the local wireless communication network group, the network topology relationship information of adjacent wireless communication network groups, the wireless links status information of adjacent wireless communication network groups, information of adjacent cells around detected by the RS, and so on.

There is also a plurality of triggering methods for the wireless relay station unsolicitedly requesting the update of the connection relationship: such as, a. discovering a better wireless signal, b. the need for obtaining better wireless resource, c. the need for applying for better service quality, d. the need for the network management, and so on.

Step 720, after the BS receives the request, if determining that the handover can be performed, the BS determines a target node selected by the BS and sends a handover request to the target node, otherwise the BS denies the request;

After receiving the request, the BS may take the target node selected by RS1 as the target node selected by the BS, or may select part of the target nodes selected by RS1 as those selected by the BS based on the information provided by RS1, the information stored by the BS (the same as the stored information in step 610) and a preset strategy, or may select a new target node for RS1.

Step 730, after the BS receives the response that the target node allows the handover, if RS1 has data to transmit, while reserving the original connection, the BS establishes a data tunnel to the target node for RS1, and then instructs RS1 to update the connection to the target node;

The establishment of the data tunnel, communication of the attributes of the terminals and RSs connecting to RS1 and pre-storing the synchronization information of the target BS or RS all may apply the above content of the first scheme, and will not be repeated here.

Step 740, after RS1 receives the connection update instructions, it starts the connection update, and after establishing a wireless link with the new node, RS1 releases the no longer used resource in the original data tunnel;

Step 750, the management nodes in the communication groups of RS1 before and after the connection relationship update (the same BS or RS for a handover within the group) update the stored wireless network topology information of the communication group to complete the process of updating the connection relationship of RS1.

The last three steps and their concrete implementation are the same as those in the first scheme and will not be described in detail. Similarly, the above connection relationship update may be reported by RS1 to the agent node RS to which RS1 accesses, whose flow is basically identical with the above flow, and it is merely needed to replace the BS in the group of RS1 with the agent node RS in the communication sub-network of RS1.

It should be noted that the present invention is not limited to establishing a tunnel to the target node before starting the connection relationship update, in the situation that the basic quality requirement is met, just the method that RSs or terminals synchronize with possible adjacent base stations/RSs in advance is adopted, or may just notify the BS of the target node of the wireless connection attributes of RS1 and/or the attributes of RS1 and the terminals and RSs connecting to RS1.

INDUSTRIAL APPLICABILITY

The present invention can be applied in a wireless communication system comprising wireless relay stations to fulfill the update of the connection relationship of a wireless relay station.

What we claim is:

1. A method for updating a connection relationship of a wireless relay station comprising the following steps of:
   (a) a wireless relay station RS1 already connecting to a first wireless communication network group comprising a first base station and wireless relay stations subjected to the first base station, and if determining that the connection relationship of RS1 needs to be changed, selecting a target node, wherein there exists a second wireless communication network group comprising a second base station and wireless relay stations subjected to the second base station, and the target node is one of the second base station and wireless relay stations subjected to the second base station; and
   (b) instructing RS1 to update the connection to the target node, and after receiving the instructions, RS1 starting a connection update, establishing a wireless link to a new node and releasing no longer used resource in an existing data tunnel;
   wherein, in step (b), if RS1 has data to transmit, while reserving an original connection or original connections, a wireless relay station as an agent node in a communication sub-network of RS1 or the first base station establishing a data tunnel to the target node for RS1 and sending downlink data of RS1 in this data tunnel before the RS1 receives the instructions to update the connection.

2. A method of claim 1 further comprising:
a first management node in the first wireless communication network group storing a topology relationship information of the first wireless communication network group, a second management node in the second wireless communication network group storing a topology relationship information of the second wireless communication network group, and after step (b) the method further comprising a step of: (c) the first management node and the second management node updating stored wireless network topology information; or a first management node in the first wireless communication network group storing a topology relationship information of the first wireless communication network group, a second management node in the second wireless communication network group storing a topology relationship information of the second wireless communication network group, and RS1 accessing to communication sub-networks before and after the update, and agent nodes in said communication sub-networks storing wireless network topology information of the communication sub-networks, and after step (b) the method further comprising a step of: the first management node and the second management node updating stored wireless network topology information, and meanwhile, the agent nodes in the communication sub-networks of RS1 before and after the update updating the stored wireless network topology information of the communication sub-networks.

3. A method of claim 1 wherein,
in step (a), whether the connection relationship of RS1 should be changed is determined by the first base station based on a stored information and a preset strategy, and the target node is selected by the first base station; and in step (b), the first base station sends to RS1 said instructions to update the connection to the target node; or
in step (a), whether the connection relationship of RS1 should be changed is determined by a wireless relay station as an agent node in a communication sub-network to which RS1 belongs based on a stored information and a preset strategy, and the target node is selected by the wireless relay station as the agent node; and in step (b), said wireless relay station as the agent node sends to RS1 said instructions to update the connection to the target node.

4. A method of claim 3 wherein,
in step (a), whether the connection relationship of RS1 should be changed is determined by the wireless relay station as the agent node in the communication sub-network of RS1 or the first base station based on a stored information and a preset strategy, and there is one or any combination of the following triggering modes: need for coverage, need for load balancing, need for increasing throughput, need for improving service quality, and need for network management by an operator.

5. A method of claim 1 further comprising:
in step (a), RS1 determining whether the connection relationship of RS1 should be changed based on a stored information and a preset strategy, and after selecting a target node, RS1 unsolicitedly sending a handover request to the first base station or a wireless relay station as an agent node in a communication sub-network to which RS1 belongs; and after the first base station or wireless relay station receives the handover request, if determining that the handover can be performed, the first base station or wireless relay station determining a target node selected by the first base station or wireless relay station, otherwise rejecting the handover request.

6. A method of claim 5 further comprising:
after the first base station or wireless relay station as the agent node receives the handover request from RS1, taking the target node selected by RS1 as the target node selected by the first base station or wireless relay station as the agent node; or based on an information provided by RS1, a stored information and a preset strategy, choosing part of the target nodes selected by RS1 as the target nodes selected by the first base station or wireless relay station as the agent node; or selecting a new target node for RS1 based on an information provided by RS1, a stored information and a preset strategy.

7. A method of claim 5 wherein
triggering modes for RS1 to unsolicitedly request an update of the connection relationship in step (a) comprise one or more of the following: discovering a better wireless signal, need for obtaining better wireless resource, need for applying for better service quality and need for network management.

8. A method of claim 1 wherein,
in step (a), the information, based on which whether the connection relationship of RS1 should be updated is determined and the target node is selected, comprises one or more pieces of the following information: network topology relationship information of the first wireless communication network group, wireless links status information of the first wireless communication network group, network topology relationship information of other wireless communication network groups adjacent to the first wireless communication network group, wireless links status information of other wireless communication network groups adjacent to the first wireless communication network group and information of adjacent cells detected by RS1.

9. A method of claim 1 further comprising:
in step (a), after the first base station or wireless relay station as the agent node selects the target node, firstly sending a handover request to the target node, and after obtaining a response that the target node allows the handover, instructing RS1 to update the connection in step (b).

10. A method of claim 1 wherein
said data tunnel to the target node is established according to one of the following modes:
the first mode is: if the target node is the second base station, a data node at the network side→the first base station of RS1 before a handover→the second base station; if the target node is a wireless relay station connecting to the second base station, a data node at the network side→the first base station of RS1 before a handover→the second base station→the wireless relay station connecting to the second base station;
the second mode is: if the target node is the second base station, a data node at the network side→the second base station; if the target node is a wireless relay station connecting to the second base station, a data node at the network side→the second base station→the wireless relay station connecting to the second base station;
the third mode is: a data node at the network side→the first base station to which RS1 accesses before a handover→the wireless relay station to which RS1 accesses before a handover→the wireless relay station connecting to the second base station or the second base station.

11. A method of claim 1 further comprising:
in step (b), before instructing RS1 to update the connection to the target node, if RS1 has data to transmit, while reserving an original connection or original connections, the first base station of RS1 before a handover, or a wireless relay station as an agent node in a communication sub-network to which RS1 belongs, or the network side, sending attributes of RS1 and wireless relay stations and terminals connecting to RS1 to the second base station or a wireless relay station as an agent node in a communication sub-network to which the target node belongs, to be used during an access.

12. A method of claim 1 further comprising:
wireless relay stations or terminals obtaining synchronization information of possible adjacent base stations or adjacent wireless relay stations in advance and storing this synchronization information; in step (b), after wireless relay stations and terminals connecting to RS1 receive instructions to update connections, finding the synchronization information of the target node in the instructions from the stored synchronization information of adjacent base stations and adjacent wireless relay stations, and synchronizing with the target node and establishing wireless network connections.

13. A method of claim 2 wherein the first management node is the first base station, and the second management node is the second base station.

14. A method of claim 3 wherein,
in step (a), the information, based on which whether the connection relationship of RS1 should be updated is determined and the target node is selected, comprises one or more pieces of the following information: network topology relationship information of the first wireless communication network group, wireless links status information of the first wireless communication network group, network topology relationship information of other wireless communication network groups adjacent to the first wireless communication network group, wireless links status information of other wireless communication network groups adjacent to the first wireless communication network group, and information of adjacent cells detected by RS1.

15. A method of claim 5 wherein,
in step (a), the information, based on which whether the connection relationship of RS1 should be updated is determined and the target node is selected, comprises one or more pieces of the following information: network topology relationship information of the first wireless communication network group, wireless links status information of the first wireless communication network group, network topology relationship information of other wireless communication network groups adjacent to the first wireless communication network group, wireless links status information of other wireless communication network groups adjacent to the first wireless communication network group, and information of adjacent cells detected by RS1.

16. A method of claim 5 further comprising:
in step (a), after the first base station or wireless relay station as the agent node selects the target node, firstly sending a handover request to the target node, and after obtaining a response that the target node allows the handover, instructing RS1 to update the connection in step (b).

17. A method of claim 3 further comprising:

in step (b), before instructing RS1 to update the connection to the target node, if RS1 has data to transmit, while reserving an original connection or original connections, the first base station of RS1 before a handover, or a wireless relay station as an agent node in a communication sub-network to which RS1 belongs, or the network side, sending attributes of RS1 and wireless relay stations and terminals connecting to RS1 to the second base station of the target node or a wireless relay station as an agent node in a communication sub-network to which the target node belongs, to be used during an access.

18. A method of claim 5 further comprising:

in step (b), before instructing RS1 to update the connection to the target node, if RS1 has data to transmit, while reserving an original connection or original connections, the first base station of RS1 before a handover, or a wireless relay station as an agent node in a communication sub-network to which RS1 belongs, or the network side, sending attributes of RS1 and wireless relay stations and terminals connecting to RS1 to the second base station of the target node or a wireless relay station as an agent node in a communication sub-network to which the target node belongs, to be used during an access.

19. A method of claim 3 further comprising:

wireless relay stations or terminals obtaining synchronization information of possible adjacent base stations or adjacent wireless relay stations in advance and storing this synchronization information; in step (b), after wireless relay stations and terminals connecting to RS1 receive instructions to update connections, finding the synchronization information of the target node in the instructions from the stored synchronization information of adjacent base stations and adjacent wireless relay stations, and synchronizing with the target node and establishing wireless network connections.

20. A method of claim 5 further comprising:

wireless relay stations or terminals obtaining synchronization information of possible adjacent base stations or adjacent wireless relay stations in advance and storing this synchronization information; in step (b), after wireless relay stations and terminals connecting to RS1 receive instructions to update connections, finding the synchronization information of the target node in the instructions from the stored synchronization information of adjacent base stations and adjacent wireless relay stations, and synchronizing with the target node and establishing wireless network connections.

* * * * *